United States Patent
Morikawa (10) Patent No.: US 7,224,257 B2
(45) Date of Patent: May 29, 2007

(54) PHYSICAL QUANTITY SENSING ELEMENT HAVING IMPROVED STRUCTURE SUITABLE FOR ELECTRICAL CONNECTION AND METHOD OF FABRICATING SAME

(75) Inventor: Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 192 days.

(21) Appl. No.: 11/015,720

(22) Filed: Dec. 20, 2004

(65) Prior Publication Data

US 2005/0140493 A1    Jun. 30, 2005

(30) Foreign Application Priority Data

Dec. 25, 2003   (JP)   ............... 2003-431012

(51) Int. Cl.
*H01C 10/10*   (2006.01)

(52) U.S. Cl. ............................... 338/47; 338/2

(58) Field of Classification Search ............. 338/2–5, 338/47; 200/237; 73/766, 862.625, 862.627, 73/862.68; 501/103, 105, 152; 219/201, 219/482; 29/621.1; 252/515.1
See application file for complete search history.

(56) References Cited

U.S. PATENT DOCUMENTS

| | | | | |
|---|---|---|---|---|
| 5,081,437 A | * | 1/1992 | Mosser et al. .................. 338/2 |
| 5,175,132 A | * | 12/1992 | Ketcham et al. ............. 501/103 |
| 5,193,394 A | * | 3/1993 | Suda ............................ 73/766 |
| 5,681,784 A | * | 10/1997 | Friese ......................... 501/103 |
| 5,773,728 A | * | 6/1998 | Tsukada et al. ................. 338/5 |
| 5,877,411 A | * | 3/1999 | Namerikawa et al. ...... 73/64.53 |
| 6,143,207 A | * | 11/2000 | Yamada et al. .............. 252/515 |
| 6,534,430 B2 | * | 3/2003 | Makino et al. .............. 501/152 |
| 6,870,139 B2 | * | 3/2005 | Petrenko ..................... 219/482 |
| 2001/0020694 A1 | | 9/2001 | Makino et al. |
| 2004/0074306 A1 | | 4/2004 | Kinoshita et al. ............. 73/774 |

FOREIGN PATENT DOCUMENTS

| | | | |
|---|---|---|---|
| EP | 0 352 773 A2 | | 1/1990 |
| JP | 10233541 A | * | 9/1998 |
| JP | A 2002-202209 | | 7/2002 |
| JP | 2003089580 A | * | 3/2003 |

* cited by examiner

*Primary Examiner*—Tu Hoang
(74) *Attorney, Agent, or Firm*—Oliff & Berridge PLC (57) ABSTRACT

A physical quantity sensing element according to the invention includes an insulating layer and a sensing layer. The sensing layer is configured to generate an electrical signal as a function of a physical quantity applied thereto and has a surface that includes a first and a second area. The first area is completely covered with the insulating layer so that the physical quantity is to be applied to both the insulating layer and the sensing layer through the first area; the second area is exposed to an application direction of the physical quantity without being covered with the insulating layer and being subject to application of the physical quantity. With such a structure, easy and reliable electrical connection of the physical quantity sensing element with external devices and circuits is ensured. In addition, several practical methods of fabricating the physical quantity sensing element according to the invention are also provided.

8 Claims, 6 Drawing Sheets

Step 1

Step 2

Step 3

Step 4

FIG. 7

Step 2

Step 3

Step 4

PHYSICAL QUANTITY SENSING ELEMENT HAVING IMPROVED STRUCTURE SUITABLE FOR ELECTRICAL CONNECTION AND METHOD OF FABRICATING SAME

CROSS-REFERENCE TO RELATED APPLICATION

This application claims priority from Japanese Patent Application No. 2003-431012, filed on Dec. 25, 2003, the content of which is hereby incorporated by reference into this application.

BACKGROUND OF THE INVENTION

1. Technical Field of the Invention

The present invention relates generally to physical quantity sensors for sensing physical quantities such as force, pressure, torque, velocity, acceleration, impact strength, weight, mass, degree of vacuum, turning effort, vibration, and noise. More particularly, the invention relates to an improved structure of a physical quantity sensing element which ensures easy and reliable electrical connection of the sensing element with external devices and circuits.

2. Description of the Related Art

Physical quantity sensors, such as load sensors making use of piezoresistive materials and pressure sensors employing pressure-sensitive elements, have been widely used. The piezoresistive materials here denote materials which have the piezoresistive effect that when a stress, such as a compression stress, a tensile stress, a shearing stress, and a hydrostatic stress, is applied to the material, the electrical resistance of the material changes as a function of the stress.

Generally, a physical quantity sensing element, which composes a physical quantity sensor, detects a physical quantity as a pressure, generates an electrical signal indicative of the detected pressure, and outputs the generated electrical signal to external devices and circuits. Accordingly, the sensing element is essentially provided with means for outputting electrical signals, such as electrodes and terminals.

Such electrical signal outputting means for the sensing element may be provided in different manners depending on the structure of the sensing element.

For example, a conventional physical quantity sensing element has a structure where a pair of electrode layers is respectively disposed over each of the two major faces of a pressure-sensitive layer through which a physical quantity is to be applied to the pressure-sensitive layer, and a pair of insulating layers is respectively disposed over each of the two electrode layers. Further, the pair of electrode layers is so arranged as to protrude outwardly from the insulating layers, thus forming protruded portions of the electrode layers which serve as the electrical signal outputting means of the sensing element.

With such a structure, the electrode layers may become damaged when a large physical quantity is applied to the sensing element, so that the sensing element cannot provide a correct electrical signal representative of the applied physical quantity.

Moreover, Japanese Unexamined Patent Publication No. 2002-202209, the English equivalent of which is US Patent Application Publication No. 2004/0074306 A1, discloses another type of physical quantity sensing element.

The physical quantity sensing element includes a pressure sensing body that has an opposite pair of major faces perpendicular to the application direction of the physical quantity to be sensed, and an opposite pair of side faces parallel to the application direction of the physical quantity. The sensing element further includes a pair of pressure exerted bodies and a pair of electrodes serving as the electrical signal outputting means of the sensing element. The pressure exerted bodies are respectively disposed on each of the two major faces of the pressure sensing body, while the electrodes are respectively disposed on each of the two side faces of the same.

Since the electrodes are disposed on the side faces of the pressure sending body which are not subject to application of the physical quantity, they can be prevented from being damaged due to application of large physical quantities. However, with such an arrangement of electrodes, it becomes difficult to make electric connection of the sensing element with external devices and circuits by means of, for example, electrical terminals and wire bonding.

SUMMARY OF THE INVENTION

It is, therefore, a primary object of the present invention to provide a physical quantity sensing element that has an improved structure suitable for electrical connection and methods of fabricating the physical quantity sensing element.

According to one aspect of the present invention, a physical quantity sensing element is provided which includes an insulating layer and a sensing layer.

The sensing layer is configured to generate an electrical signal as a function of a physical quantity applied thereto and has a surface that includes a first and a second area. The first area of the surface of the sensing layer is completely covered with the insulating layer so that the physical quantity is to be applied to both the insulating layer and the sensing layer through the first area; the second area of the same is exposed to an application direction of the physical quantity without being covered with the insulating layer and being subject to application of the physical quantity.

In such a structure, means for outputting electrical signals, such as electrodes and terminals, can be provided on the second area of the surface of the sensing layer which is free from application of the physical quantity to the sensing element. As a consequence, the electrical signal outputting means can be prevented from being damaged due to application of the physical quantity, while facilitating the electrical connection of the sensing element with external devices and circuits.

Further, the first and the second areas of the surface of the sensing layer may be parallel to each other and together constitute one flat major face of the sensing layer.

It is preferable that the second area of the major face of the sensing layer is constituted of two or more separate subareas, so that more than two electrical signal outputting means can be provided away form each other on those separate subareas.

Preferably, those separate subareas are symmetrically positioned on the major face of the sensing layer, so that overall information about the physical quantity applied to the sensing element can be obtained, thereby ensuring high accuracy in sensing the physical quantity.

Furthermore, it is preferable that the major face of the sensing layer has a quadrangular shape, and the first area of the major face has an octagonal shape; the first area is centrally positioned on the major face such that four subareas each having a triangular shape, which constitute the second area of the major face, are provided at four apexes of the major face. Such an arrangement of the subareas can be obtained in a very simple way, thus simplifying fabrication of the physical quantity sensing element.

It is also preferable that the second area of the major face of the sensing layer is positioned on an outer periphery of the major face, so that formation of electrical signal outputting means thereon can become easy, and electrical connection of the electrical signal outputting means with outer devices and circuits can also be facilitated.

On the other hand, the second area of the surface of the sensing layer may be inclined at a given angle less than 90 degrees to the first area of the same.

In some cases, it may be difficult to make electrical connection of the sensing layer with external devices and circuits in a direction perpendicular to the first area of the surface of the sensing layer due to the shapes of external devices connected to the sensing element.

With the second area being inclined to the first area at the given angle, it may become easy to make the electrical connection of the sensing layer in such cases regardless of the shapes of the external devices.

The physical quantity sensing element according to the present invention may further include two or more electrical terminals provided on the second area of the surface of said sensing layer for making electrical connection of said sensing layer with outer devices and circuits.

It is preferable that the sensing layer of the physical quantity sensing element is mainly made of a ceramic and a piezoresistive material, and the insulating layer of the same is mainly made of a ceramic. The use of ceramic materials for both the sensing layer and the insulating layer ensures the physical quantity sensing element of high strength.

Further, it is preferable that both of the ceramics, of which the sensing layer and the insulating layer are mainly made, are zirconia. The use of zirconia for those layers ensures that the physical quantity sensing element has high heat resistance and high fracture toughness, as well as high strength.

It is also preferable the piezoresistive material, of which the sensing layer is mainly made, is $La_{1-x}Sr_xMnO_3$ ($0 \leq x \leq 1$).

Furthermore, it is preferable that an ohmic resistance of the sensing layer changes as a function of the physical quantity applied thereto, and the physical quantity is to be sensed depending on a change in the ohmic resistance of the sensing layer.

According to another aspect of the present invention, four methods of fabricating a physical quantity sensing element are provided.

The first one of those methods includes the steps of:

providing an insulating layer and a sensing layer that is capable of generating an electrical signal as a function of a physical quantity applied thereto, the sensing layer having a surface that includes a first and a second area, the insulating layer having such a shape that the insulating layer can completely cover both the first and the second areas of the surface of the sensing layer;

forming a multilayer structure by disposing the insulating layer over both the first and the second areas of the surface of the sensing layer so that the physical quantity is to be applied to both the insulating layer and the sensing layer through the first area, without the second area being subject to application of the physical quantity; and removing a portion of the insulating layer from the second area of the surface of the sensing layer so as to expose the second area.

The second method is similar to the first one; the difference between the two methods is that the last step of the first method is omitted from the second method by providing an insulating layer that has a shape different from that of the insulating layer provided in the first method.

More specifically, the insulating layer has such a shape that it can completely cover only the first area of the surface of the sensing layer, while leaving the second area of the same exposed. In the second step, the insulating layer is disposed over the first area of the surface of the sensing layer so that the physical quantity is to be applied to both the insulating layer and the sensing layer through the first area, while the second area of the surface of the sensing layer remains exposed without being subject to application of the physical quantity.

It is preferable that the steps of forming a multilayer structure in both of the first and the second methods include bonding the insulating layer to the sensing layer either by an adhesive agent, or by thermocompression.

The third and the fourth methods of fabricating a physical quantity sensing element are different from the first and the second methods mainly in that powders are directly used in forming a multilayer structure in the third and the fourth methods.

The third and the fourth methods are similar to each other; the difference between the two methods is that the last step of removing a portion of the sensing layer in the third method is omitted from the fourth method by use of a frame.

The fourth method of fabricating a physical quantity sensing element includes the steps of:

providing a first powder for forming a sensing layer capable of generating an electrical signal as a function of a physical quantity applied thereto, and a second powder for forming an insulating layer;

depositing the first powder to form a first powder layer having a given thickness, the first powder layer having a surface that includes a first and a second area;

depositing the second powder over the first area of the surface of the first powder layer, with a frame that is disposed over the second area of the same, to form a second powder layer having a given thickness;

forming a multilayer structure including the sensing layer and the insulating layer by sintering both the first and the second powder layers; and removing the frame from the second area of the surface of the sensing layer so as to expose the second area.

It is preferable that the steps of forming a multilayer structure in both of the third and the fourth methods includes sintering both the first and the second powder layers simultaneously by pressure sintering.

Consequently, the physical quantity sensing element according to the present invention, which has an improved structure suitable for electrical connection, can be easily fabricated by using any of the four methods according to the invention.

The improved structure of the physical quantity sensing element according to the invention facilitates electrical connection of the sensing element with external devices and circuits, while preventing the electric signal outputting means provided in the sensing element from being damaged due to application of large physical quantities.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1–7.

Among those preferred embodiments, the first and the second ones illustrate a physical quantity sensing element according to the invention, while the third and the fourth ones are directed to a method of fabricating a physical quantity sensing element according to the invention.

It should be noted that, for the sake of clarity and understanding, identical components having identical functions in different embodiments of the invention have been marked, where possible, with the same reference numerals in each of the figures.

[First Embodiment]

Figure 1:
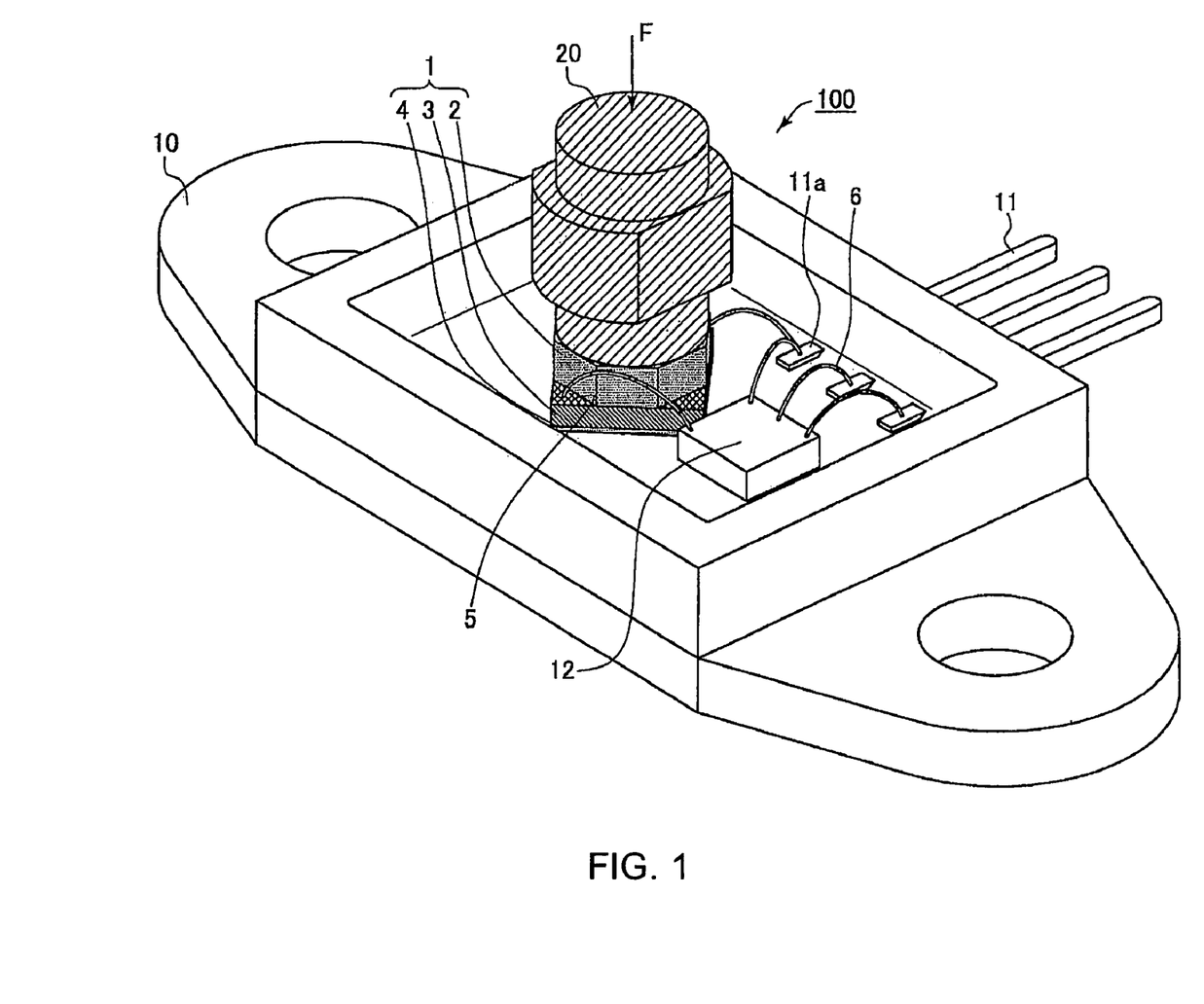
FIG. 1 is a schematic perspective view showing a sensor structure in which a physical quantity sensing element according to the present invention is used.

FIG. 1 shows an overall structure of a physical quantity sensor 100 that includes a physical quantity sensing element 1 according to the present embodiment.

The physical quantity F to be sensed is, for example, a load; it is applied to the physical quantity sensor 100 in the direction indicated by the straight-line arrow.

The physical quantity sensing element 1 includes, as shown in FIG. 1, a first insulating layer 2, a sensing layer 3, and a second insulating layer 4, all of which are stacked in the application direction of the physical quantity F.

On the first insulating layer 2, there is provided a joint 20 for joining the physical quantity sensor 100 to a physical quantity applying device (not shown), so that the physical quantity F is to be applied through the first insulating layer 2 to the sensing layer 3. A case 10, which is made of ceramic, supports the sensing element 1 against application of the physical quantity F.

The case 10 is connected with terminals 11 to input/output electrical signals. Further, on the case 10, a circuit chip 12 is provided. The terminals 11 each have an end 11a (referred to as terminal end 11a hereinafter) electrically connected with the circuit chip 12 by wire bonding 6.

The circuit chip 12 is also electrically connected with the sensing layer 3 of the physical quantity sensing element 1 by wire bonding 6. The circuit chip 12 carries an arithmetic circuit to calculate the value of a physical quantity F, depending on the change in the electrical resistance of the sensing layer 3 that is caused by application of the physical quantity F to the sensing element 1. The circuit chip 12 may also carry a temperature sensing element to sense the temperature of the sensing layer 3, thereby calculating a more accurate value of the physical quantity F based on the sensed temperature as well as the change in the electrical resistance of the sensing layer 3.

Figure 2A:
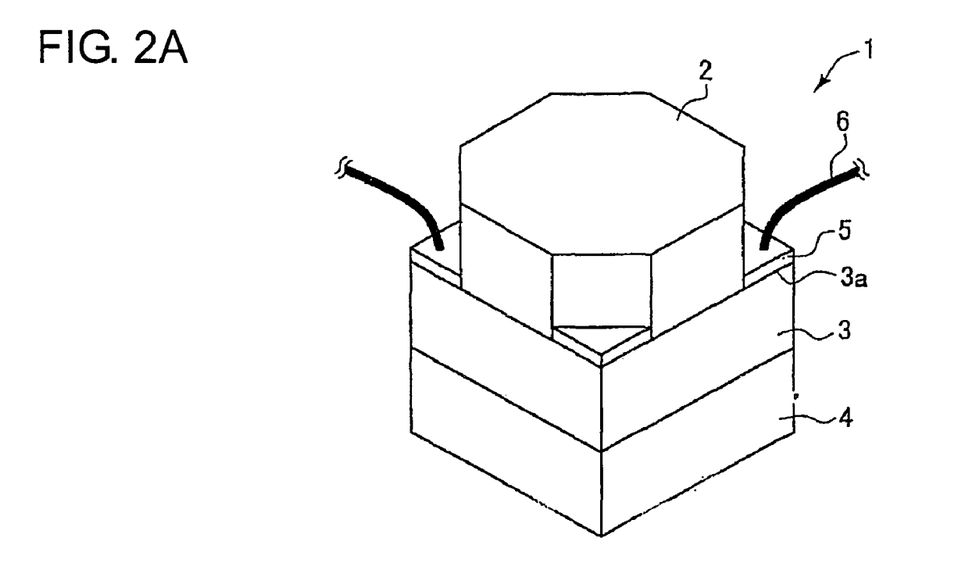
FIG. 2A is a schematic perspective view showing a physical quantity sensing element according to the first embodiment of the invention.
Figure 2B:
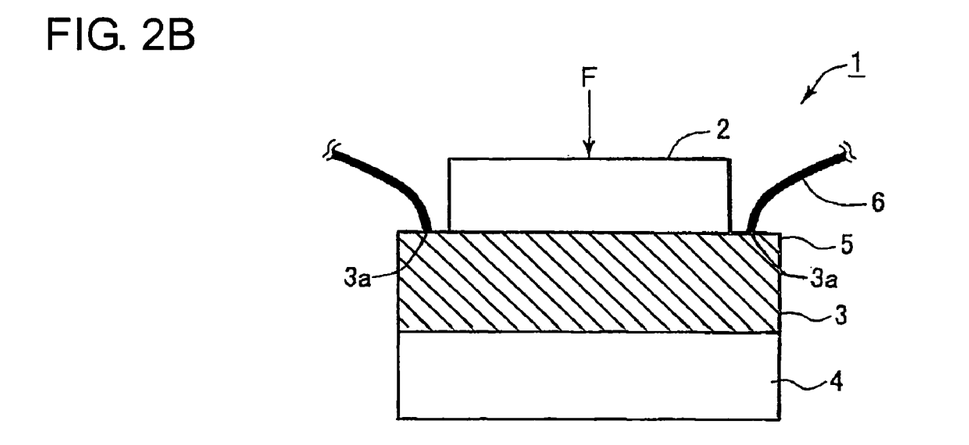
FIG. 2B is a partially cross-sectional side view showing the physical quantity sensing element of FIG. 2A.

Referring now to FIGS. 2A–2B, the major face of the sensing layer 3, on which the first insulating layer 2 is disposed, includes exposed areas 3a which are not covered with the first insulating layer 3. On the exposed areas 3a (referred to as electrical connection areas 3a hereinafter), there are provided metal electrodes 5 which are electrically connected with the circuit chip 12 and the terminal ends 11a by wire bonding 6.

The sensing layer 3 and the second insulating layer 4 have, as shown in FIG. 2A, the same quadrangular shape of cross-sectional surface perpendicular to the application direction of the physical quantity F so as to overlap each other completely.

On the other hand, the first insulating layer 2 has an octagonal cross-sectional surface perpendicular to the application direction of the physical quantity F; it is so centrally disposed on the major face of the sensing layer 3 that four electrical connection areas 3a each having a triangular shape are formed at four apexes of the major face of sensing layer 3.

The electrodes 5, which are provided on the electrical connection areas 3a, are made of an Ag-based alloy. The electrodes 5 may also be made of other metal materials, such as Au, Pt, Al, Ni, Cu and their alloys, or electrically conductive non-metal materials such as carbon.

The sensing layer 3 is made using a ceramic as a main component so as to have sufficiently high strength to endure application of large physical quantities. More specifically, the sensing layer 3 is mainly made of an electrically insulating ceramic constituting a matrix and a piezoresistive material that is dispersed in the matrix so as to impart electrically conductive properties to the sensing layer 3.

The piezoresistive material may include one or more kinds of substances such as $(Ln_{1-x}Ma_x)_{1-y}MbO_{3-z}$ with a perovskite structure (where, $0.0<x\leq 0.5$, $0.0\leq y\leq 0.2$, $0.0\leq z\leq 0.6$, Ln: rare earth element, Ma: one or more kinds of alkaline earth elements, Mb: one or more kinds of transition-metal elements), $(Ln_{2-u}Ma_{1+u})_{1-v}Mb_2O_{7-w}$ with a layered perovskite structure (where, $0.0<u\leq 1.0$, $0.0\leq v\leq 0.2$, $0.0\leq w\leq 1.0$, Ln: rare earth element, Ma: one or more kinds of alkaline earth element, Mb: one or more kinds of transition-metal elements) and Si.

It is preferable that the piezoresistive material used for the sensing layer 3 is $La_{1-x}Sr_xMnO_3$ ($0\leq x\leq 1$).

The ceramic constituting the matrix may include one or more kinds of substances such as $ZrO_2$ (zirconia), $Al_2O_3$, $MgAl_2O_4$, $SiO_2$, $3Al_2O_3 \cdot 2SiO_2$, $Y_2O_3$, $CeO_2$, $La_2O_3$, and $Si_3N_4$.

In this embodiment, the ceramic constituting the matrix is zirconia, which has high strength and high fracture toughness at normal temperatures.

As to the details about the structure and materials of the sensing layer 3, one can refer to Japanese Unexamined Patent Publications No. 2002-202209, No. 2001-242019, and No. 2002-145664, the disclosures of which are totally incorporated herein by reference.

As the sensing layer 3, both the first and second insulating layers 2 and 4 are mainly made of a ceramic to have a high strength. Also, the ceramic may include one or more kinds of substances such as $ZrO_2$ (Zirconia), $Al_2O_3$, $MgAl_2O_4$, $SiO_2$, $3Al_2O_3.2SiO_2$, $Y_2O_3$, $CeO_2$, $La_2O_3$, and $Si_3N_4$.

In this embodiment, the two insulating layers are made of the same ceramic as the sensing layer 3, i.e., zirconia. Additionally, piezoresistive materials may also be added to the zirconia in an extent that no electrically conductive property is imparted to those insulting layers.

Since zirconia is used for the sensing layer 3 and the insulating layers 2 and 4, the physical quantity sensing element 1 has high heat resistance, high strength, and high fracture toughness.

Moreover, the above-described structure of the sensing layer 3 provides the sensing layer 3 with such a property that the ohmic resistance of the sensing layer 3 changes as a function of the physical quantity F applied thereto. Accordingly, the physical quantity F applied to the sensing element 1 can be sensed depending on the change in the ohmic resistance of the sensing layer 3.

To sum up, the physical quantity sensing element 1 according to the present embodiment has a structure where the sensing layer 3, which is configured to generate an electrical signal representative of the physical quantity F applied thereto, is sandwiched between the first and second insulating layers 2 and 4.

The sensing layer 3 has a surface that includes a first area being completely covered with the first insulating layer 2 and a second area consisting of the electrical connection areas 3a. The first and the second areas together constitute the major face of the sensing layer 3 which is a unitary flat surface. The physical quantity F is to be applied to both the first insulating layer 2 and the sensing layer 3 through the first area; accordingly, the second area is not subject to application of the physical quantity F to the sensing element 1.

Moreover, the triangular electrical connection areas 3a, on which the electrodes 5 for outputting electrical signals are provided, are symmetrically positioned on the outer periphery of the major face.

Accordingly, the structure of the physical quantity sensing element 1 prevents the electrodes 5 from being damaged due to application of the physical quantity F, while facilitating the electrical connection of the electrodes 5 with the circuit chip 12 and terminal ends 11a by wire bonding 6.

It should be noted that, instead of the above-described major face of the sensing layer 3, the electric connection areas 3a may also be provided on the other major face of the sensing layer 3 abutting the second insulating layer 4 in the manner that has so far been described. In other words, the physical quantity sensing element 1 according to the present embodiment has the electrical connection areas 3a, on which no insulating layer is disposed, provided on any of the two major faces of the sensing layer 3 which are perpendicular to the application direction of the physical quantity F.

[Variations]

FIGS. 3A–3D illustrate variations of the physical quantity sensing element 1 according to the first embodiment of the invention.

Figure 3A:
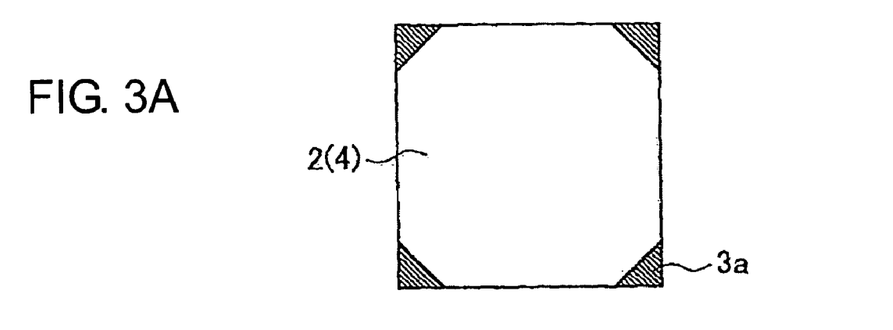
FIGS. 3A–3D are end views illustrating variations of the physical quantity sensing element according to the first embodiment of the invention.

FIG. 3A shows the formation of the electrical connection areas 3a of the physical quantity sensing element 1. As described previously, the insulating layer 2 (or 4) has the shape of an octagonal prism and is centrally disposed on the corresponding major face of the sensing layer 3 having a quadrangular shape, so that four triangular electrical connection areas 3a are exposed at the corners of the major face.

Figure 3B:
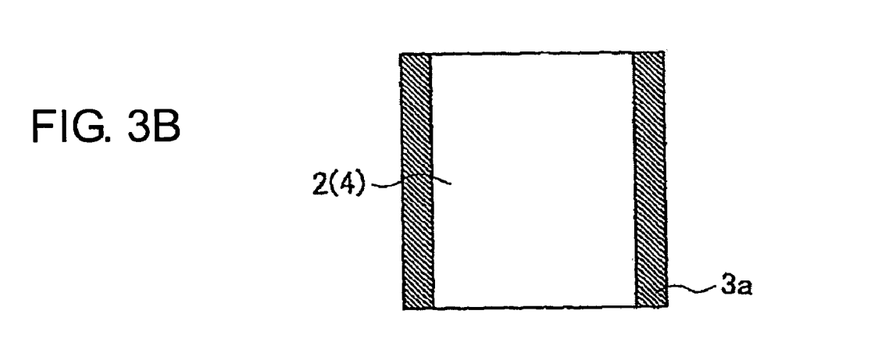

FIG. 3B shows a variation of the physical quantity sensing element 1. As shown in the figure, the insulating layer 2 (or 4) has the shape of a quadrangular prism and is so disposed on the major face of the sensing layer 3, which has a quadrangular shape, that a pair of quadrangular electrical connection areas 3a is formed on two opposite sides of the major face.

Figure 3C:
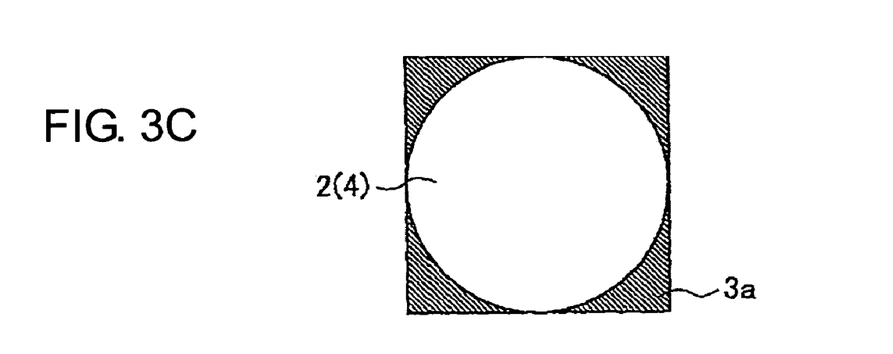

FIG. 3C shows another variation of the physical quantity sensing element 1. The insulating layer 2 (or 4) has, as shown in the figure, the shape of a circular cylinder and is centrally disposed on the major face of the sensing layer 3 having a quadrangular shape, so that four electrical connection areas 3a, each of which includes a circular arc boundary, are formed at the corners of the major face.

Figure 3D:
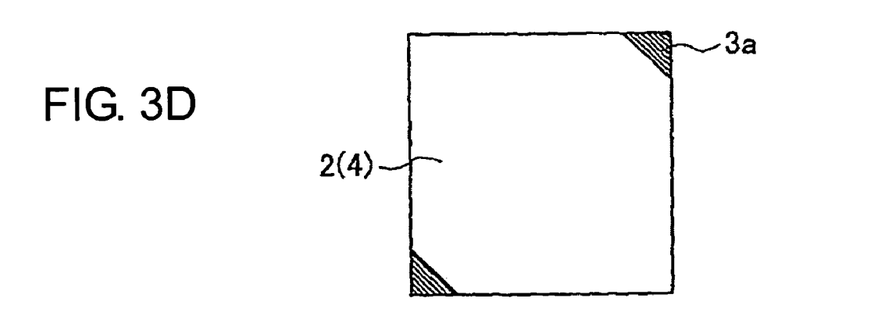

FIG. 3D shows yet another variation of the physical quantity sensing element 1. As shown in the figure, the insulating layer 2 (or 4) has the shape of a hexagonal prism and is so disposed on the major face of the sensing layer 3, which has a quadrangular shape, that a pair of triangular electrical connection areas 3a is formed at two opposite corners of the major face.

Besides those illustrative variations described above, there may exist a variety of manners of forming the electrical connection areas 3a on any of the two major faces of the sensing layer 3, without departing from the scope of the present invention.

In order to make electrical connection of the sensing layer 3 with external devices and circuits, it is generally required to provide at least two electrodes 5, which constitute the electrical signal outputting means of the sensing layer 3, on the electrical connection areas 3a.

When all the electrodes 5 are disposed on a single electrical connection area 3a closely with each other, electrical signals that represent only local, rather than overall, information about the physical quantity F are obtained. Further, to dispose the electrodes 5 on the single electrical connection area 3a away from each other, the electric connection area 3a is required to be large. However, providing a large electrical connection area 3a may result in a correspondingly reduced first area of the major face of the sensing layer 3 through which the physical quantity F is applied to the sensing element 1; accordingly, a large portion of the sensing element 1 cannot be utilized for the purpose of sensing the physical quantity F.

Therefore, in order to dispose the electrodes 5 away from each other without increasing the electrical connection area 3a, it is preferable that two or more electrical connection areas 3a are formed on the major face of the sensing layer 3 so that the electrodes 5 can be provided on different electrical connection areas 3a respectively.

Furthermore, it is preferable that the electric connection areas 3a are symmetrically provided on the major face of the sensing layer 3. As a consequence, overall information about the physical quantity F applied to the physical quantity sensing element 1 can be obtained, thereby ensuring high accuracy of the sensing element 1. Additionally, one electrical connection area 3a may also be provided on the central area of the major face, thereby ensuring more accurate sensing of the physical quantity F together with other symmetrically provided electrical connection areas 3a.

It is also preferable that the electrical connection areas 3a are provided on the outer periphery of the major face of the sensing layer 3, so as to make the formation of electrical signal outputting means, such as terminals and electrodes, on those areas easy and facilitate electrical connection of the sensing layer 3 with outer devices and circuits by, for example, wire bonding.

The electrical connection areas 3a preferably have the above-described triangular shape as shown in FIG. 3A. Such a triangular shape can be obtained through, for example, a very simple way in which an insulating layer and a sensing layer, both of which have the same shape of a quadrangular-prism, are stacked together such that one major face of the sensing layer is completely covered with the insulating layer, and then four corner portions of the insulating layer are cut away so as to expose the corresponding corner areas of the major face of the sensing layer, thereby forming the triangular electrical connection areas 3a.

It has been mentioned that at least two electrodes 5 are required to make electrical connection of the sensing layer 3 with external devices and circuits. Those electrodes 5 may be formed on the electrical connection areas 3a by, for example, brazing or metalizing. As a consequence, the sensing layer 3 can be connected to the circuit chip 12 and the terminal ends 11a by wire bonding 6 at low cost.

Figure 4:
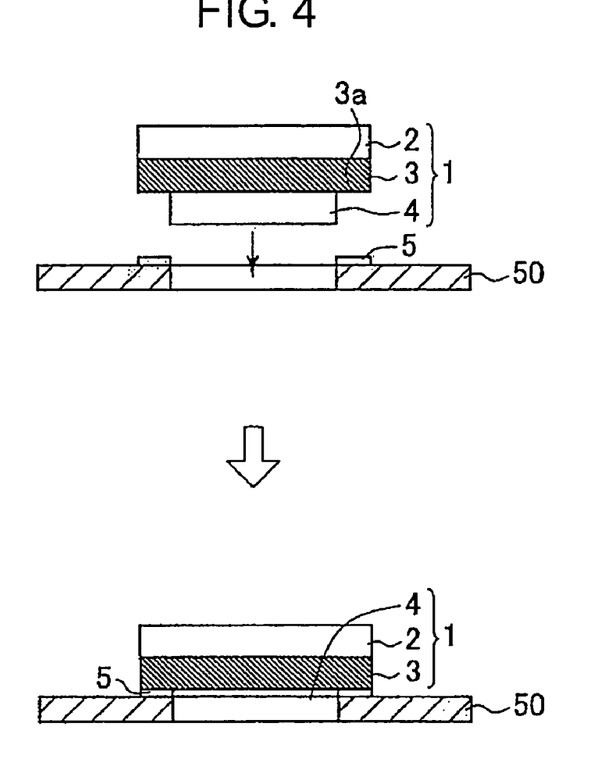
FIG. 4 is a schematic view partially in cross-section illustrating a method of connecting the physical quantity sensing element according to the first embodiment of the invention with a substrate.

The electrodes 5 may also be provided in other different ways. For example, as shown in FIG. 4, when the physical quantity sensing element 1 is to be mounted on the substrate 50, the electrodes 5 may be previously formed on the substrate 50, instead of on the electrical connection areas 3a of the sensing layer 3. After the mounting, the sensing layer 3 is connected with the substrate 50 through the electrodes 5, thereby forming an integrated sensing structure including the sensing element 1 and the substrate 50.

[Second Embodiment]

Figure 5:
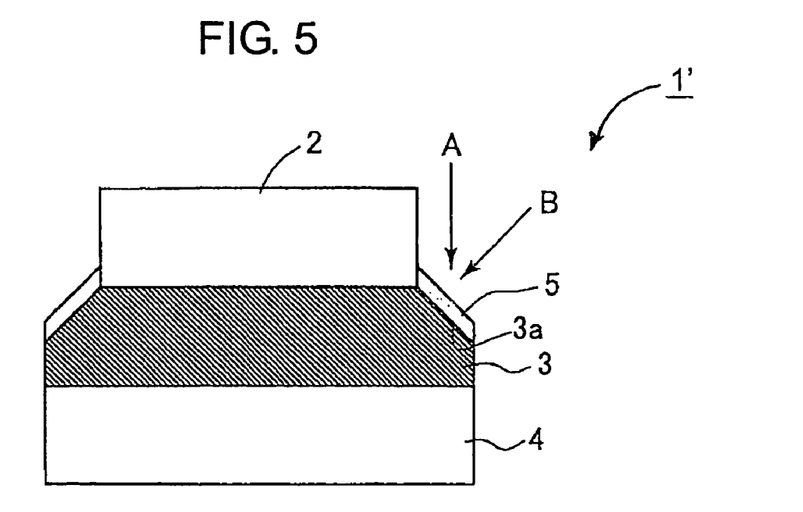
FIG. 5 is a partially cross-sectional side view showing the physical quantity sensing element according to the second embodiment of the present invention.

FIG. 5 shows a physical quantity sensing element 1' according to the second embodiment of the present invention.

The physical quantity sensing element 100 has a structure almost identical to that of the physical quantity sensing element 1 according to the previous embodiment. Accordingly, only the difference between the structures of the physical quantity sensing elements 1 and 1' will be described below.

As described previously, in the physical quantity sensing element 1, the surface of the sensing layer 3 includes a first area that is completely covered with the first insulating layer 2 and a second area that consists of the electrical connection areas 3a. The first and the second area together constitute the major face of the sensing layer 3 that is a unitary flat surface.

In comparison, in the physical quantity sensing element 1', the first and the second areas lie on different planes. More specifically, as shown in FIG. 5, the major face of the sensing layer 3 includes only the first area that is completely covered with the first insulating layer 2; the second area that consists of the electrical connection areas 3a is inclined to the first area at a given angle.

In some cases, it may be difficult to make electrical connection of the sensing layer 3 with external devices and circuits in the A direction indicated in FIG. 5, due to the shape of a joint 20 as shown in FIG. 1 and/or the shape of a physical quantity applying device to be joined to the sensing element 1' through the joint 20. In such cases, it is preferable to make the electrical connection of the sensing layer 3 in the B direction indicated in FIG. 5, rather than in the A direction.

With the second area being inclined to the first area, in the physical quantity sensing element 1', it becomes easy to make the electrical connection of the sensing layer 3 by, for example, wire bonding 6 in the B direction, thereby facilitating the electrical connection of the sensing layer 3.

In addition, the electrical connection process may be easily performed by inclining the whole sensor 100 that includes the sensing element 1' such that the electrical connection areas 3a lie on the horizontal plane, in other words, the direction B becomes to represent the downward vertical direction.

[Third Embodiment]

Figure 6:
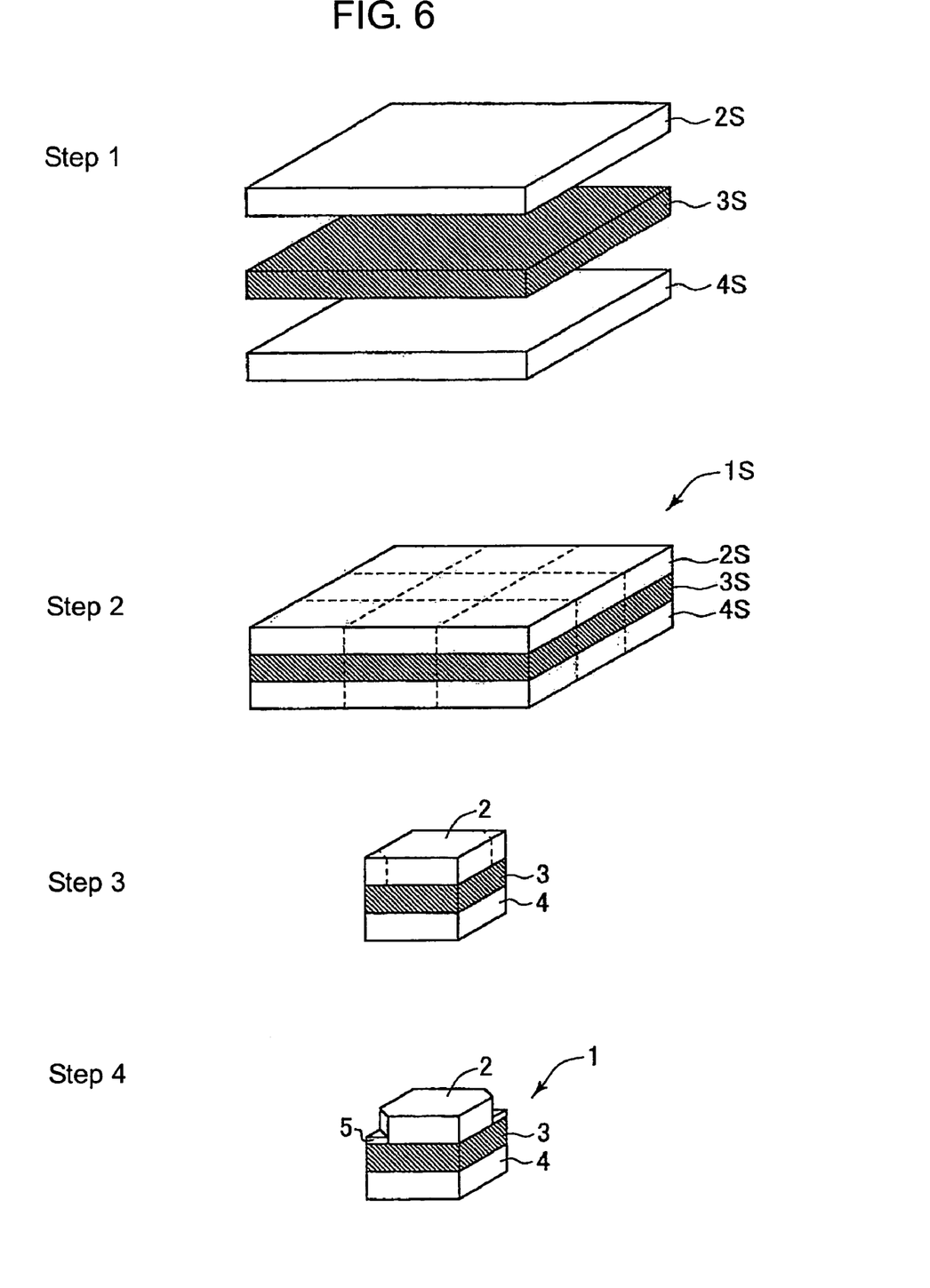
FIG. 6 is a schematic perspective view illustrating a method according to the third embodiment of the present invention of fabricating a physical quantity sensing element of the invention.

FIG. 6 illustrates a method of fabricating a physical quantity sensing element of the invention according to the present embodiment.

In the figure, there is shown the physical quantity sensing element 1 of the first embodiment of the invention. However, the fabrication method of the present embodiment should not be limited to fabrication of the specific physical quantity sensing element 1; it can also be applicable to fabrication of any other physical quantity sensing elements according to the invention.

Fabrication of the physical quantity sensing element 1 has been conducted by the following steps.

In Step 1, powders of a piezoresistive material of $La_{0.62}Sr_{0.38}MnO_3$ and a ceramic of 12 wt % $CeO_2$ added $ZrO_2$ for constituting the matrix were blended at a given ratio, for example, of 3:7 to provide a blended powder for forming the sensing layer 3. The blended powder was then mixed and crushed for four hours in a pulverizing mill, for example a ball mill, and dried to obtain a mixed powder. The mixed powder was put in an agitation mixer together with a resin binder, water, and additives, and kneaded to obtain a slurry. The slurry was then used to form sensing sheets each having a given thickness, for example, of 100 μm by a doctor blade method. Three thus formed sensing sheets are laminated together to obtain a sensing lamination 3S. It should be noted that the number and thickness of the sensing sheets used to form the sensing lamination 3S had been determined considering the shrinkage of the sensing sheets that is to occur in the forthcoming sintering process.

Next, as a material for forming the first and second insulating layers 2 and 4, a powder of the ceramic of 12 wt % $CeO_2$ added $ZrO_2$ was prepared. The powder was then processed in the same way as the mixed powder for the sensing layer 3. Specifically, the powder was kneaded, together with a resin binder, water, and additives, in an agitation mixer so as to obtain a slurry. Using the slurry, insulating sheets each having a given thickness, for example, of 100 μm were formed by a doctor blade method. Three of thus formed insulating sheets are laminated together to form a first insulating lamination 2S, and another three of the same are also laminated together to form a second sensing lamination 4S. The number and thickness of the insulating sheets to form the insulating laminations 2S and 4S had also been determined considering the shrinkage of the insulating sheets to occur in forthcoming sintering process. Additionally, the first and second insulating laminations 2S and 4S were formed to have the same size of major face as the sensing lamination 3S.

It should be noted that the three layers 2S, 3S, and 4S have the same thickness of 300 μm in FIG. 6; however, the three layers may have different thickness, for example, of 600 μm, 300 μm, 600 μm respectively.

In Step 2, the sensing lamination 3S and the first and second insulating laminations 2S and 4S were stacked, as shown in FIG. 6, to form a multi lamination structure 1S in which the sensing lamination 3S is sandwiched between the two insulating laminations 2S and 4S. Thereafter, the multi lamination structure 1S underwent thermocompression process by, for example, a hot press; it was then fired in a furnace to remove the resin binders through thermal decomposition. After CIP (Cold Hydrostatic Press), the multi lamination structure 1S was sintered in a sintering furnace in a given condition, for example the temperature of 1500° C. and the time period of 4 hours. As a consequence, a multilayer structure was obtained which consists of three integrally sintered layers, i.e., the first insulating layer 2, the sensing layer 3, and the second insulating layer 4.

In Step 3, the multilayer structure was cut into multilayer blocks each of which has a given size, for example, of 5 mm×5 mm×0.9 mm.

In Step 4, predetermined portions of the first insulating layer 2 was cut away from the multilayer block so as to provide exposed areas on the major face of the sensing layer 3 on which the first insulating layer 2 is disposed.

Consequently, the physical quantity sensing element 1 was obtained, where the exposed areas constitute the electrical connection areas 3a of the sensing element 1.

In addition, silver paste was baked on the electrical connection areas 3a of the physical quantity sensing element 1 so as to form electrodes 5 thereon.

[Variations]

In the Step 3 of the method according to the previous embodiment, both the first and second insulating laminations 2S and 4S were bonded to the sensing lamination 3S by thermocompression. The thermocompression also has the effects of provisional resin binder removing and provisional sintering.

Instead of the thermocompression, those insulating laminations 2S and 4S may also be bonded to the sensing lamination 3S by a very simple method, i.e., using an organic adhesive agent, an inorganic adhesive agent, or a junction layer (not shown).

However, when an adhesive agent used in the bonding is not resistant to high temperatures (especially in the case of an organic adhesive agent), it cannot endure the heat applied thereto in the sintering process.

In such cases, the laminations 2S, 3S, and 4S may be separately sintered in advance, and then be bonded together by the adhesive agent. As a consequence, the multilayer structure can be obtained through very simple operations at low cost.

Furthermore, in the method of the previous embodiment, the multilayer structure was formed and cut into multilayer blocks in advance, and then predetermined portions of the first sensing layer 2 of each block is cut away to form the electrical connection areas 3a.

However, before forming the multi lamination structure 1S in the Step 2, predetermined portions of the first insulating lamination 2S may be cut way in advance, so as to expose the electrical connection areas 3a in the subsequently formed multi lamination structure.

In this way, the step 4 of the method according to the previous embodiment can be omitted, thereby improving fabrication efficiency of the physical quantity sensing element.

[Fourth Embodiment]

In this embodiment, another method of fabricating a physical quantity sensing element of the invention is provided, which is different from the method of the previous embodiment.

The following description is made particularly for fabrication of the physical quantity sensing element 1; however, it should be noted that the method of the present embodiment can also be applicable to fabrication of any other physical quantity sensing elements according to the invention.

According to the method of the present embodiment, fabrication of the physical quantity sensing element 1 has been conducted by the following steps.

In Step 1, powders of $La_{0.62}Sr_{0.38}MnO_3$ and 12 wt % $CeO_2$ added $ZrO_2$ were blended at a given ratio, for example, of 3:7 to provide a blended powder for forming the sensing layer 3. Then, as a material for forming the first and second insulating layers 2 and 4, a powder of $ZrO_2$ was prepared.

In Step 2, the powder of $ZrO_2$ was deposited to form a second insulating powder layer 4P having a given thickness, for example, of 300 µm, and then the blended powder was deposited over the powder layer 4P to form a sensing powder layer 3P having a given thickness, for example, of 300 µm. Further, over the sensing powder layer 3P, the powder of $ZrO_2$ was again deposited to form a first insulating powder layer 2P having a given thickness, for example, of 300 µm. In this way, a multi powder layer structure 1P was obtained which had a size, for example, of 40 mm×40 mm×0.9 mm.

The multi powder layer structure 1P was then sintered to form a multilayer structure that consists of three integrally sintered layers, i.e., the first insulating layer 2, the sensing layer 3, and the second insulating layer 4.

It should be noted that the three powder layers 2P, 3P, and 4P have the same thickness of 300 µm in the above description; however, the three powder layers may have different thickness, for example, of 800 µm, 300 µm, 800 µm respectively. Further, the three powder layers in the multi powder layer structure 1P were simultaneously sintered by pressure sintering.

In Step 3, the multilayer structure was cut into multilayer blocks each having a given size, for example, of 5 mm×5 mm×0.8 mm.

In Step 4, predetermined portions of the first insulating layer 2 was cut away from the multilayer block so as to provide exposed areas on the major face of the sensing layer 3 on which the first insulating layer 2 is disposed.

Consequently, the physical quantity sensing element 1 was obtained, where the exposed areas constitute the electrical connection areas 3a of the sensing element 1.

[Variations]

Figure 7:
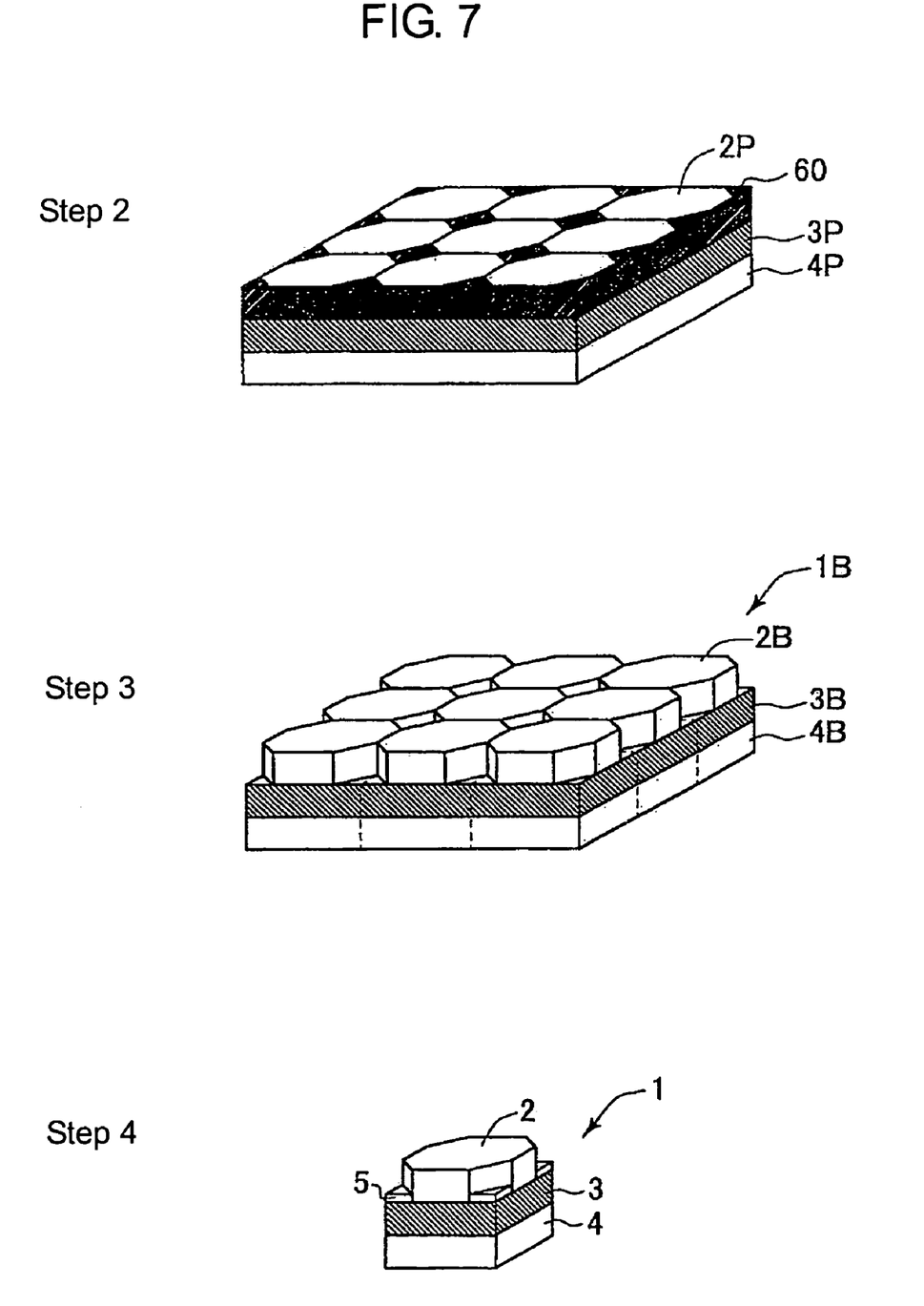
FIG. 7 is a schematic perspective view illustrating a method according to the fourth embodiment of the present invention of fabricating a physical quantity sensing element of the invention.

Fabrication of the physical quantity sensing element 1 according to the method of the previous embodiment has been simplified by using a frame in the step 2 of the method.

As shown in FIG. 7, a frame 60 was disposed, in the step 2 of the method, on the major face of the sensing powder layer 3P; then, the powder of $ZrO_2$ was deposited over the remaining area of the major face to form the first insulating powder layer 2P.

The frame 60 had such a shape that, when it was removed from the sintered multilayer structure in the subsequent Step 3, a plurality of portions of the major face of the sensing layer 3 was exposed, thereby forming the electrical connection areas 3a.

Consequently, the physical quantity sensing element 1 was completed in the Step 4 of cutting the multilayer structure into smultilayer blocks each having a given size, without any further steps to cut away portions of the first sensing layer 2 for forming the electrical connection areas 3a.

In addition, the frame 60 may have various shapes corresponding to desired shapes of the electrical connection areas 3a of the physical quantity sensing element 1. Moreover, it is necessary that the frame 60 be made of a material capable of withstanding high sintering temperature.

While the above particular embodiments of the invention have been shown and described, it will be understood by those who practice the invention and those skilled in the art that various modifications, changes, and improvements may be made to the invention without departing from the spirit of the disclosed concept. Such modifications, changes, and improvements within the skill of the art are intended to be covered by the appended claims.

What is claimed is:

1. A physical quantity sensing element comprising:
    an insulating layer; and
    a sensing layer configured to generate an electrical signal as a function of a physical quantity applied thereto, said sensing layer having a surface that includes a first and a second area, the first area being completely covered with said insulating layer so that the physical quantity is to be applied to both said insulating layer and said sensing layer through the first area, the second area being exposed to an application direction of the physical quantity without being covered with said insulating layer and being subject to application of the physical quantity, wherein
    the first and the second areas of the surface of said sensing layer are parallel to each other and together constitute one flat major face of said sensing layer;
    the second area of the major face of said sensing layer is constituted of two or more separate subareas; and
    the major face of said sensing layer has a quadrangular shape, and wherein the first area of the major face, which is covered with said insulating layer, has an octagonal shape and is centrally positioned on the major face such that four subareas each having a triangular shape, which constitute the second area of the major face, are provided at four apexes of the major face of said sensing layer.

2. The physical quantity sensing element as set forth in claim 1, further comprising two or more electrical terminals provided on the second area of the surface of said sensing layer for making electrical connection of said sensing layer with an external.

3. The physical quantity sensing element as set forth in claim 1, wherein said sensing layer is mainly made of a ceramic and a piezoresistive material, and said insulating layer is mainly made of a ceramic.

4. The physical quantity sensing element as set forth in claim 3, wherein both of the ceramics, of which said sensing layer and said insulating layer are mainly made, are zirconia.

5. The physical quantity sensing element as set forth in claim 3, wherein the piezoresistive material, of which said sensing layer is mainly made, is $La_{1-x}Sr_xMnO_3$ ($0 \leq x \leq 1$).

6. The physical quantity sensing element as set forth in claim 1, wherein an ohmic resistance of said sensing layer changes as a function of the physical quantity applied to said sensing layer, and wherein the physical quantity is to be sensed depending on a change in the ohmic resistance of said sensing layer.

7. A method of fabricating a physical quantity sensing element comprising the steps of:
    providing a first powder for forming a sensing layer capable of generating an electrical signal as a function of a physical quantity applied thereto, and a second powder for forming an insulating layer;
    forming a first powder layer having a given thickness using the first powder, the first powder layer having a surface that includes a first and a second area;
    depositing the second powder over the first area of the surface of the first powder layer, with a frame that is disposed over the second area of the surface of the first powder layer, to form a second powder layer having a given thickness;
    forming a multilayer structure including said sensing layer and said insulating layer by sintering both the first and the second powder layers; and
    removing the frame from the second area of the surface of said sensing layer so as to expose the second area.

8. The method of fabricating a physical quantity sensing element as set forth in claim 7, wherein the step of forming the multilayer structure comprises sintering both the first and the second powder layers simultaneously by pressure sintering.

* * * * *